US012078005B2

United States Patent
Blokpoel et al.

(10) Patent No.: US 12,078,005 B2
(45) Date of Patent: Sep. 3, 2024

(54) BRAKING DEVICE

(71) Applicant: Edscha Engineering GmbH, Remscheid (DE)

(72) Inventors: Christiaan Blokpoel, Soto de la Marina (ES); Jose-Manuel Gutierrez-Fernandez, Sobremazas (ES); Jochen Bals, Dortmund (DE); Matthias Obrig, Wuppertal (DE)

(73) Assignee: EDSCHA ENGINEERING GMBH, Remscheid (DE)

( * ) Notice: Subject to any disclaimer, the term of this patent is extended or adjusted under 35 U.S.C. 154(b) by 383 days.

(21) Appl. No.: 17/427,089

(22) PCT Filed: Jan. 31, 2020

(86) PCT No.: PCT/DE2020/100060
§ 371 (c)(1),
(2) Date: Jul. 29, 2021

(87) PCT Pub. No.: WO2020/156619
PCT Pub. Date: Aug. 6, 2020

(65) Prior Publication Data
US 2022/0098914 A1    Mar. 31, 2022

(30) Foreign Application Priority Data
Jan. 31, 2019  (DE) ...................... 20 2019 100 595.5

(51) Int. Cl.
*F16D 49/16*   (2006.01)
*E05F 5/00*    (2017.01)

(52) U.S. Cl.
CPC ................ *E05F 5/00* (2013.01); *F16D 49/16* (2013.01); *E05Y 2201/21* (2013.01);
(Continued)

(58) Field of Classification Search
CPC .... F16D 49/16; E05F 5/00; E05F 5/02; E05F 5/06; E05F 5/022; E05Y 2201/21;
(Continued)

(56) References Cited

U.S. PATENT DOCUMENTS 2,777,546 A * 1/1957 Kelley .................... B64C 25/46
                                                      188/176
3,025,938 A * 3/1962 Silberger ................ F16D 49/16
                                                      477/7
(Continued)

FOREIGN PATENT DOCUMENTS

CN      101563517 A    10/2009
CN      107787389 A    3/2018
(Continued)

OTHER PUBLICATIONS

Corresponding PCT International Search Report of PCT/DE2020/100060.

*Primary Examiner* — Thomas J Williams
(74) *Attorney, Agent, or Firm* — Davidson Kappel LLC (57) ABSTRACT

A brake device for a drivable part, in particular for use for a vehicle flap, in particular in an automobile, includes a drivable load device (11) which can be radially brought into contact with a disc (90) of the drivable part, with a first holding position and a second release position. At least one brake element rests against the periphery (92) of the disc (90) in a frictional manner in the holding position and secures the disc (90) from rotating using a specifiable force. In the release position, the at least one brake element is arranged at a distance from the periphery of the disc (90) and allows a free run of the disc (90), and the load device (11) can be adjusted between the holding position and the release position, preferably by a motor (12). A brake device or a rotating drive with which a drivable part of the drive is secured against a displacement on the basis of the mass of (Continued)

the component to be displaced even when the motor is not being provided with power or is deactivated is achieved in that the first holding position and the second release position are each designed as a metastable holding position.

19 Claims, 4 Drawing Sheets

(52) U.S. Cl.
CPC ... *E05Y 2201/218* (2013.01); *E05Y 2201/246* (2013.01); *E05Y 2201/26* (2013.01); *E05Y 2201/408* (2013.01); *E05Y 2201/484* (2013.01); *E05Y 2201/638* (2013.01); *E05Y 2201/688* (2013.01); *E05Y 2900/531* (2013.01); *E05Y 2900/546* (2013.01); *E05Y 2900/548* (2013.01)

(58) Field of Classification Search
CPC ......... E05Y 2201/218; E05Y 2201/246; E05Y 2201/26; E05Y 2201/408; E05Y 2201/484; E05Y 2201/638; E05Y 2201/688; E05Y 2900/531; E05Y 2900/546; E05Y 2900/548
USPC ........................................ 188/74, 75, 83, 85
See application file for complete search history.

(56) References Cited

U.S. PATENT DOCUMENTS

| | | | | |
|---|---|---|---|---|
| 4,023,655 | A | * | 5/1977 | Anzai ..................... F16D 59/02 188/162 |
| 5,090,522 | A | * | 2/1992 | Korff ...................... F16D 65/46 188/166 |
| 2003/0080600 | A1 | | 5/2003 | Eppert |
| 2009/0266672 | A1 | | 10/2009 | Scheck |
| 2017/0350175 | A1 | | 12/2017 | Hoffmann et al. |
| 2018/0216384 | A1 | | 8/2018 | Rietdijk |
| 2022/0098914 | A1 | * | 3/2022 | Blokpoel .............. E05F 15/622 |

FOREIGN PATENT DOCUMENTS

| | | |
|---|---|---|
| DE | 102015215627 A1 | 2/2017 |
| EP | 2284345 A1 | 2/2011 |
| JP | H03272375 A | 12/1991 |
| JP | H05112129 A | 5/1993 |
| JP | H1145640 A | 2/1999 |
| JP | 2009068176 A | 4/2009 |
| SU | 898173 A1 * | 1/1982 |
| WO | WO2012079552 A1 | 6/2012 |

* cited by examiner

BRAKING DEVICE

The present disclosure relates to a braking device for a drivable part, in particular for use for a vehicle flap, in particular in an automobile. The present disclosure also relates to a rotary drive.

BACKGROUND

Drives are known from practice which move drivable components, in particular about a pivot axis, wherein an electric motor delivering a sufficiently high torque to overcome the load resulting from the mass of the components. For example, in the case of vehicle flaps such as trunk lids, the drive moves them from the closed position to the open position and back. Since the vehicle can tilt, the motor is designed in such a way that it delivers a sufficiently high torque to be able to open and/or close the flap even with unfavorable parameters. The known drives often have slip clutches so that the component to be driven can be opened or closed manually in the event of a malfunction. A disadvantage of the known drives is the fact that the drive must be permanently energized to hold the drivable component in an intermediate position. This leads to a high expenditure of energy and unnecessary heating of the drives as well as a reduced service life of the components.

It is known from practice to temporarily fix a vehicle flap, for example a side door or a tailgate, of an automobile, such as a motor vehicle or an electric vehicle, if the circumstances so require. This can be, for example, an impending collision with an obstacle such as another parked automobile or a wall, or the wish of a passenger to support himself on the flap. Furthermore, when transporting bulky goods in the trunk, it happens again and again that the tailgate cannot be locked because the goods protrude into the pivoting path. In these cases, it is desirable to be able to lock the flap in a position other than the closed position in order to prevent collisions and/or an undesired automatic opening due to vibrations. Correspondingly, it should also be effectively prevented that an open flap can be closed, as a result of which, for example, a user's limbs such as hands, fingers or head could be injured. In particular in the case of motor-driven vehicle flaps, there is a need for a braking device which has at least one holding position and one release position and thus allows the driven flap to be locked.

Of particular relevance is the provision of a braking device for side doors of automobiles which, even when the automobile is slightly inclined, tend toward an open or closed position due to the influence of gravity and which accordingly represent a risk of collision with obstacles.

DE 10 2015 215 627 A1 describes a braking device for use in a vehicle flap, in particular in an automobile, comprising a rope that can be wound up over a drum and that sets the drum in rotation depending on the movement of a door holding position, wherein the drum being coupled to a drivable part in the shape of a rotatable shaft, which forms a disc at the end, with which a drivable loading device can be brought into radial contact and can assume a first holding position and a second release position, wherein in the holding position two braking members in the form of brake shoes frictionally abut a circumference of the disc and secure them against rotation with a pre-settable force, wherein the braking members being spaced from the circumference of the disc in the release position and allowing the disc to run freely, wherein the loading device is adjustable between the holding position and the release position, for example by a motor. The motor drives, via a pinion and a gear, a toothed portion of a lever which turns a common adjusting element of the two brake shoes into the first holding position or into the second release position, depending on the position of the toothed portion. The disadvantage of this known braking device is, on the one hand, that the lever requires a large amount of installation space, which is often not available. Furthermore, the movement into the holding position takes place more strongly the more the lever is deflected. However, if the motor is not energized, for example due to an interruption in the energy supply, there is a risk that the holding position will be gradually released due to vibrations or external forces acting on the drum. Conversely, when the motor is not energized, the braking device can slip out of the second release position into a braking or even complete holding position under the impression of tension springs mutually prestressing the brake shoes, thereby blocking the flap in an undesirable manner. In particular, it is not ensured that, in addition to the defined first holding position and the defined second release position, intermediate positions can be approached in which undesired braking occurs, which wears the brake linings and causes braking noises when the flap is moved and does not provide a defined holding torque.

SUMMARY

It is an object of the present disclosure to provide a braking device respectively a rotary drive by means of which a drivable part of the drive is secured against displacement due to the mass of the component to be displaced, even when the motor is not energized or is switched off.

A braking device for a drivable part, in particular for use for a vehicle flap, in particular in an automobile, is provided, comprising a drivable loading device that can be brought into radial contact with a disc of the drivable part, having a first metastable holding position and a second metastable release position, wherein, in the holding position, at least one braking member frictionally abuts a circumference of the disc and secures it against rotation using a pre-settable force, wherein, in the release position, the at least one braking member is spaced from the circumference of the disc and allowing the disc to run, wherein the loading device is adjustable between the holding position and the release position, e.g. by a motor. The braking device can advantageously be a unit comprising a housing of the drivable part. The braking device makes it possible to fix the disc of the drivable part and thus acts like a switchable brake, without the drive having to be permanently energized in an intermediate position. In a first preferred variant, the braking torque applied by the friction is designed such that the resulting braking torque on a flap or the like is high enough to hold the flap at extreme inclines, but low enough that the flap can still be moved by hand with force. At this point, this is therefore an overload clutch that allows an emergency actuation. The disc of the drivable part, which is expediently connected non-rotatably to a rotatable shaft, is locked in place by the loading device. However, it is also possible that the disc itself is a spindle nut, which in turn drives a spindle rod, i.e., is not non-rotatably connected to the rotatable shaft.

The loading device expediently comprises a spring member which loads the braking member toward the holding position. In the tensioned state, the spring member provides a pressing force which presses the braking member against the circumference of the disc. Depending on the design of the spring member, the holding force is therefore greater or lower. The loading device makes it possible to tension the spring member in order to move the braking member into the release position, or to relax the spring member in order to move the braking member into the holding position. The loading device thus has the advantage that it switches the spring on or off as a braking or holding element, depending on the actuation of the motor.

The spring member preferably has at least one loading leg which loads the braking member against the disc. The loading leg is, for example, the loading leg of a torsion spring, the other leg respectively the base of which is fixed to a housing part.

The spring member preferably also has a second loading leg which loads a second braking member against the disc. In this case, a base of the braking member is arranged in a stationary manner and the two legs, designed as loading legs, protrude from the base at opposite ends. In this case, the disc is advantageously frictionally fixed by a first braking member and a second braking member.

According to a preferred embodiment, the first loading leg moves a first lever in which the braking member is arranged. The second loading leg of the spring member preferably moves a second lever on which the second braking member is arranged. However, it is alternatively possible that the braking member is connected directly to the loading leg of the spring member, for example such that the loading leg has a braking portion that can radially abut the circumference of the disc. This portion of the loading leg is expediently hardened, for example by laser hardening, in order to prevent abrasion.

The first lever and/or the second lever can expediently be pivoted in an articulated manner about a pivot joint in order to ensure a defined pivoting path of the lever and thus of the braking member.

In a favorable development, the lever has an abutment respectively a receptacle for the first loading leg. What is advantageously achieved here is that the loading leg and the lever move back and forth together. Alternatively, the first lever can, on its side facing away from the disc, have only a support surface for the loading arm, so that any replacement of the spring member is made easier.

According to a particularly preferred development, the braking member is arranged on the first lever. According to a first preferred development, the braking member is a braking surface of the first lever. Advantageously, the braking surface of the first and optionally the second lever can be enlarged by forming a recess or a rounded contour so as to achieve not only a linear contact, but also a surface contact between the braking surface and the circumference of the disc. Alternatively, instead of a braking surface, an engagement roller, a toothed segment or the like can also be provided which, in addition to the frictional fixing of the disc, also allows a form fit with, for example, external toothing of the disc. However, securing the disc exclusively using friction is preferred, since this can be done practically silently and can easily be overcome by hand.

As an alternative to the embodiment of a portion of the lever as a braking surface, the lever can also have a roller, an extension, or the like that embodies the braking member.

The distance between the articulation of the lever and the braking member is expediently smaller than the diameter of the disc, which results in a favorable balance of forces.

The braking member is expediently assigned a guiding member which is not in contact with the disc. The guiding member makes it possible to move the braking member outside the region of contact between the braking member and the disc and thus to overcome the loading force of the spring member or to tension the spring member. The guiding member is expediently located in a plane which is axially spaced from the disc.

According to a favorable embodiment, the guiding member is a guiding portion on the loading leg or the lever. However, the guiding member is preferably a rotatable roller which is connected to the loading leg or the lever.

Frictional resistance and noise emission of a roller are reduced against to a guiding surface, in particular if the roller has a circumference made of possibly flexible plastics material.

The guiding member is expediently provided on the lever. Alternatively, the guiding member can also be provided on or connected to the spring member, in particular if there is no lever.

In a preferred embodiment, not only is a first braking member, respectively loading leg, respectively lever, respectively guiding member provided, but also a second braking member, respectively loading leg, respectively lever, respectively guiding member. As a result, the disc is held from two sides and the resulting holding force is correspondingly greater. In principle, however, only one braking member is required for a functioning braking device; however, a second and a further third, etc. braking member improves the holding forces and allows even weaker spring members to be used.

By bringing the braking members into contact with the radial circumference of the disc by friction, the holding force of the loading device can be overcome with manual force without the disc or the braking members being damaged in the process. An engagement with an engagement lug and toothing, similar to a ratchet or parking brake, is possible, but there is a risk of damage in the event of overload.

According to a favorable embodiment, an eccentric disc cooperates with the guiding member, wherein depending on the pivot angle of the eccentric disc the guiding member is deflected more strongly, in particular against the restoring force of the spring member, when the eccentric disc is in contact with the guiding member with a first circumferential portion, or is deflected less strongly and generates a frictional force with the disc when the eccentric disc faces the guiding member with a second circumferential portion. The first circumferential portion and the second circumferential portion are each designed as local minima of the deflection so that the guiding member does not leave the holding position and/or the release position even when the drivable part respectively a flap connected to it is moved back and forth. For this purpose, the eccentric disc has a central circumferential portion between the first circumferential portion and the second circumferential portion, which requires a greater deflection of the guiding member.

The circumferential portion of the eccentric disc does not necessarily have to be provided on the outer circumference of the eccentric disc; it can also be an inner circumferential portion, for example a link track recessed in the eccentric disc. If the guiding member is fixed in the link track, the contact radius of the braking member can be adjusted with respect to the disc by pivoting the eccentric disc. On the other hand, the emergency actuation is more difficult, there is a risk that the eccentric disc will move the guiding member in the link track under the action of vibrations and the like.

The eccentric disc preferably has a bearing axis which is at least parallel to and preferably coaxial with the axis of the disc. In this way, a uniform and synchronous introduction of holding forces by the braking members is advantageously achieved, particularly when there are a plurality of braking members. At the same time, the eccentric disc can be mounted parallel to the disc.

The eccentric disc preferably has a central opening for a rod portion rotating with the disc, a shaft, an extension or the like, so that the eccentric disc surrounds the rotating part at a distance. This makes it possible to integrate the eccentric disc into a drive such as a spindle drive or even to retrofit it.

The eccentric disc expediently has a first circumferential portion in which the guiding member is arranged in the holding position, and a second circumferential portion in which the guiding member rests in the release position. If a plurality of guiding members are provided, at least a first circumferential portion and a second circumferential portion are expediently provided for each of the guiding members. In the release position the guiding member rests firmly against the second circumferential portion, while in the holding position the first circumferential portion can also have a gap from the guiding member.

The eccentric disc expediently has a drive portion via which a rotation about the bearing axis of the eccentric disc can be initiated. In this case, the drive portion is expediently arranged at an end which is at a maximum distance from the bearing axis, on the one hand to achieve a favorable lever ratio and on the other hand to facilitate an adjustment from the outside.

The drive portion preferably has an externally toothed disc segment, via which a reproducible adjustment of the eccentric disc is made possible without slippage. Alternatively, the drive portion can also be adjusted, for example via a multiple coupling joint, a link guide, a transmission, and the like. It is also possible to act upon the drive portion by a spring, either in the holding position or in the release position, and to overcome this biasing force by the motor. The motor that adjusts the loading device is, in a particularly favorable embodiment, also the motor that drives the disc, if in a favorable arrangement during the drive of the disc the motor moves the loading device into the release position and when the drive is terminated the loading device is moved into the holding position by a corresponding spring element or the motor. The motor and the drive expediently have a common control.

If the drive portion has an externally toothed disc segment, this is favorably in gear engagement with a gear driven by the motor, so that the motor drives the eccentric disc and thus the loading device.

In an alternative embodiment without a lever and without a guiding member, the braking members are directly connected axially to the eccentric disc and, depending on the angle of rotation of the eccentric disc, come into radial contact with the disc or not. A spring can bias the braking members in the direction of the holding position.

A favorable embodiment is characterized in that the eccentric disc has a first circumferential portion in which the guiding member rests in the holding position, and adjacent to and spaced apart therefrom on both sides has a second and third circumferential portion in which the guiding member rests in the release position. In this way, it can be achieved in a favorable manner that the holding position must be passed between the movement drive in one direction and the movement drive in the other direction.

The eccentric disc preferably has a constricted portion, the drive portion on the one side of the constricted portion and the first circumferential portion and preferably the further circumferential portions on the other side of the constricted portion being provided. The constriction is preferably provided approximately at the level of the articulation of the levers and allows the braking device to be designed to be small. At the same time, the drive portion can be designed with a small radius and accordingly provide a comparatively large path.

A rotary drive is also provided which is characterized by a braking device with one or more features that have been described above. The rotary drive is further characterized in that the disc is driven in the driven state and the disc is stationary in the non-driven state.

The drive preferably has a preferably driven rotatable part, such as a rotatable shaft, a gear element such as a worm wheel or a spindle nut or a spindle rod, which is coupled to the disc, in particular connected and/or formed in one piece. As a result, the rotatable part is equipped with an effective braking device which makes it possible to fix the drive with a holding force even in the de-energized state, which can be overcome in accordance with the design of the spring member. When a first element of a gear is locked, the other elements in gear engagement are also indirectly locked, at least in the case of positive engagement. In this respect, parts indirectly connected to the disc are also equipped with the braking device. Thus, a spindle rod can also be effectively locked or released by the braking device in that an associated spindle nut or an associated worm wheel provides the disc. The disc is then not formed on the spindle rod itself, but on a part which is in gear engagement with the spindle rod, so that a housing surrounding the spindle rod does not have to provide any recesses for the adjustment of the braking members.

The holding force of the braking device is preferably higher than the maximum torque that the component moved by the drive provides due to its mass.

As an alternative to the embodiment of the motor as a rotating motor, the motor can also be an axially adjustable electric motor, in particular an electromagnet, which is connected, for example, to a further lever arm of the lever or levers or which adjusts the abutment, alternatively the base of the spring member, in order to overcome or increase or decrease bias.

The rotary drive expediently converts a rotary movement, for example the rotary movement of a drive motor, into an axial movement, for example by moving a telescopic spindle drive apart or pushing it together. The braking device then increases the self-locking of the drive, which is often insufficient to counter the torque of the mass of the component moved by the drive with a holding force.

A housing of the drive that surrounds the disc expediently has radial recesses which allow the braking members to be advanced towards the disc. This makes it possible to provide the braking device also partially outside the housing and only to cut out the region of the housing that is required for locking the disc.

The disc particularly preferably allows the braking members to be moved radially towards the disc. This can also be achieved in that the braking device is arranged as a whole in the same housing in which the disc is also accommodated. The disc can further advantageously be arranged on the circumference of a rotatable shaft which can be moved in rotary motion by moving a vehicle flap. It is particularly favorable if the disc is arranged at a distal end of the rotatable shaft; as a result, an eccentric disc can be arranged as an extension of the distal end of the rotatable shaft, preferably concentrically to its axis. This in particular prevents the introduction of unfavorable torques.

A favorable use of the drive is for pivoting a flap about an articulation. In particular, the drive can be used for pivoting the flap of an automobile about an articulation of the flap on a body of the automobile. The flap can be a tailgate or a front flap of the automobile as well as a door, sliding door, tilting roof or spoiler of the automobile. The automobile can be either an automobile powered by an internal combustion engine or by an electric motor. In these cases, the braking device is designed to allow and/or block the pivoting of the flap about the articulation and accordingly provides a favorable use.

Further advantages, properties, developments, and designs of the present disclosure result from the description of a preferred embodiment.

BRIEF SUMMARY OF THE DRAWINGS

The present disclosure is explained below with reference to the accompanying drawings using a preferred embodiment.

DETAILED DESCRIPTION

Figure 1:
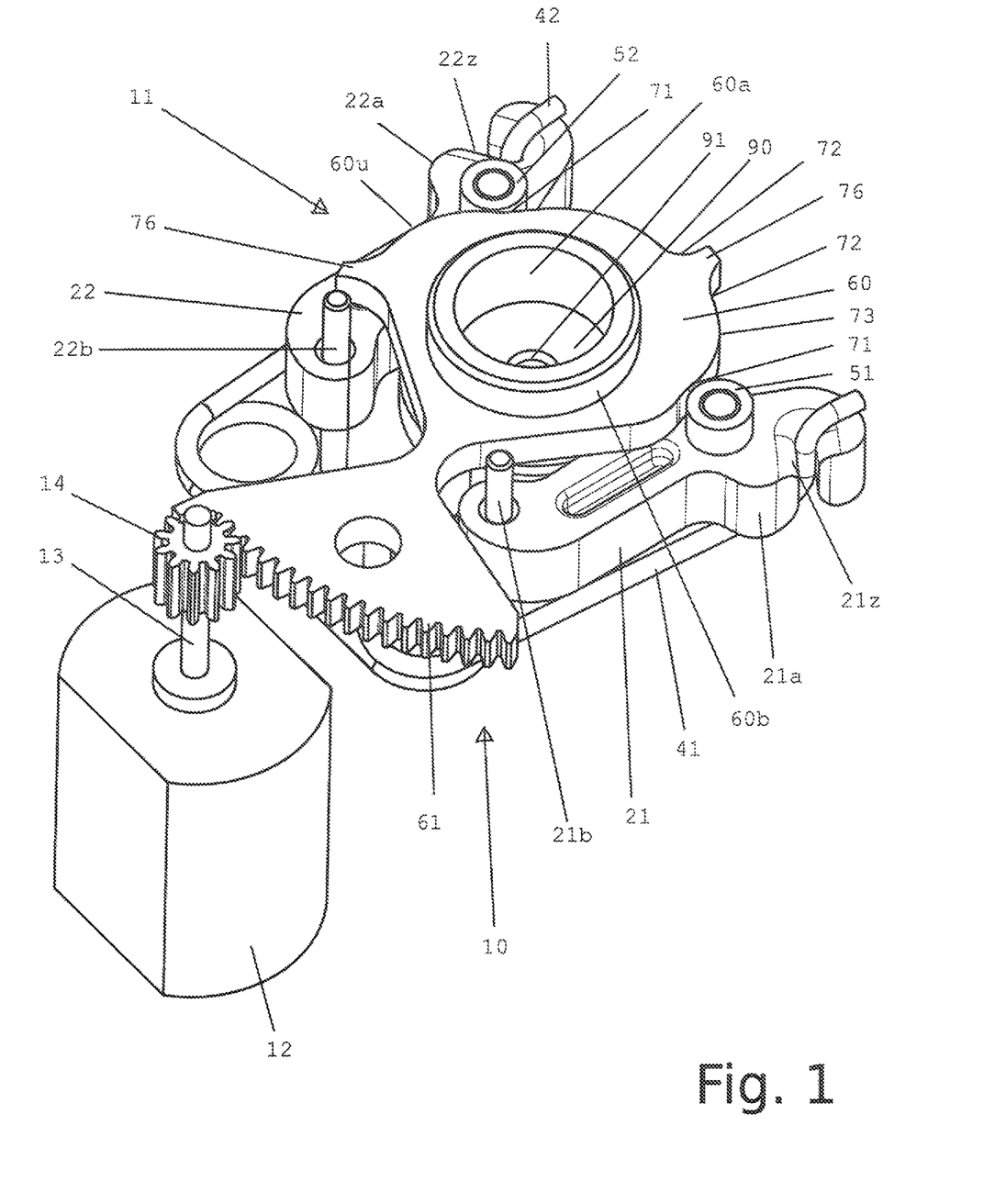
FIG. 1 is a perspective view of a preferred embodiment of a braking device according to the present disclosure.

FIG. 1 shows the overall braking device, designated 10, in a perspective view. The embodiment of the individual parts of the braking device can be seen more clearly in the exploded view according to FIG. 2. The braking device 10 has a loading device 11, which can optionally be brought into contact with a disc 90 that does not belong to the loading device 11 and that is part of a drive or a drivable part. The disc 90 has a central bore 91 with which the disc 90 can be connected to a rotatable rod. Furthermore, the disc 90 has a completely circular outer circumference 92, via which the disc 90 which rotates or allows a rotation is intended to be braked respectively locked in place by the loading device 11.

Figure 2:
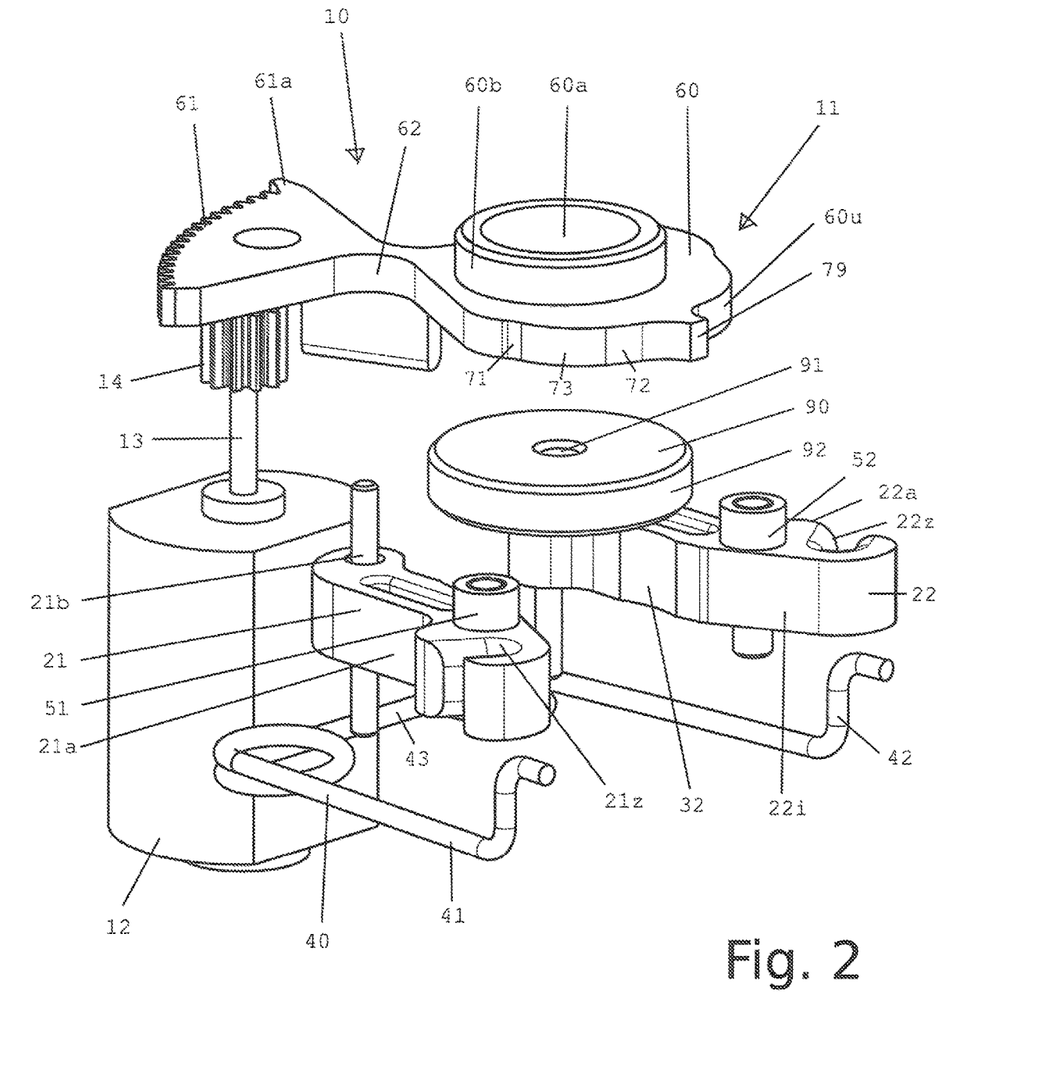
FIG. 2 is an exploded view of the braking device from FIG. 1.

The loading device 11 has a motor 12, which is a conventional electric motor with two directions of rotation and the output shaft 13 of which has a pinion or gear 14, which allows the loading device 11 to be adjusted from a holding position to a release position and vice versa. The motor 12 thus serves to adjust or switch the loading device 11 between the holding position and the release position and vice versa.

The loading device 11 also has a first lever 21 and a second lever 22, which are designed as plastics injection molded parts and which each have inner sides 21i, 22i facing one another and outer sides 21a, 22a facing away from one another. The levers 21, 22 are each designed to be pivotable about a pivot axis 21b, 22b, the pivot axis in the present embodiment being embodied as a pin. The pin can for example be connected to a housing part of the drivable part. The height of the levers 21, 22 is somewhat larger than the height of the disc 90, so that in the installed state the levers 21, 22, which lie in the plane of the disc 90, exceed the disc 90 in at least one axial direction, preferably in both axial directions, as can be seen in particular in FIGS. 4 and 6.

The levers 21, 22 each have on their inner side 21i, 22i a braking member 31, 32 designed as a braking surface, which is intended to come into contact with the circumference 92 of the disc 90 and to lock the disc 90. The braking surface 31, 32 is slightly concave with the radius of the circumference 92.

At its end facing away from the bearing 21b, 22b, each lever 21, 22 has a receptacle 21z, 22z in which the end of a spring member 40 described below can be inserted.

The spring member 40 has a first loading leg 41 and a second loading leg 42, the ends of which have an S-shaped configuration in order to be able to be received in the protruding receptacles 21z, 22z. The spring member 40 is designed in the manner of a torsion spring with two loading legs 41, 42, which connect on both sides of a base 43 of the spring member 40 and the windings connected to it. The base 43, like the journals of the bearings 21b, 22b, is connected to the housing of the part. The loading leg 41, 42 biases the levers 21, 22 in the direction of the circumference 92 of the disc 90, and the bias of the spring member 40 or the loading limb 41, 42 must be overcome in order to move the levers 21, 22 and thus to push the braking members 31, 32 away from circumference 92 of the disc 90. The spring force of the spring member 40 defines the holding force for the drivable part respectively its disc 90 and is selected by design so that the holding force is able to hold the mass of a component moved by the drivable part when the drive is de-energized, but can be overcome when the component is actuated by hand. This can be adjusted by simple experimentation.

On an upper side of each lever 21, 22, a guiding member 51, 52 designed as a plastics roller and mounted on the lever 21, 22 is connected, which can be brought into contact with the circumference of an eccentric disc 60 described below in order to pivot the braking members 31,32 via the lever 21, 22 away from the circumference 92 of the disc 90 against the bias of the two loading legs 41, 42. It can be seen that the guiding members 51, 52 lie in a common plane in which the eccentric disc 60 to be described below is also arranged.

The eccentric plate 60 is arranged concentrically and axially spaced from the disc 90 and has a central, in the present case circular opening 60a through which a shaft connected to the disc 90 can be passed at a distance from the opening 60a. The eccentric disc 60 can be pivotably guided via the opening 60a on a housing part, but the eccentric plate 60 is preferably circumferentially around an outer collar 60b which extends the opening 60a and protrudes axially from the side of the eccentric disc 60 facing away from the disc 90 out of the housing of the drive.

At its end spaced from the opening 60a, the eccentric disc 60 has an externally toothed disc segment 61 with a plurality of teeth, of which the first tooth 61a forms an end stop for the gear 14. It is possible to also equip the other end of the toothed segment 61 with a corresponding stop. The toothed segment 61 and the gear 14 mesh with one another, so that when the motor respectively the shaft 13 is actuated, the eccentric disc 60 is pivoted in the corresponding direction about the common axis A of disc 90 and eccentric disc 60. A constricted portion 62 is provided between the opening 60a and the disc segment 61, which allows the pivoting between the two axes 21b, 22b.

The eccentric disc 60 has two first circumferential portions 71 which are arranged on the outer circumference 60u of the eccentric plate in opposite positions such that the two guiding members 51, 52 simultaneously overlap the corresponding first circumferential portion 71 and correspond to the holding position. The circumference 60u of the eccentric disc 60 also has two second circumferential portions 72 which correspond to a release position.

Figure 3:
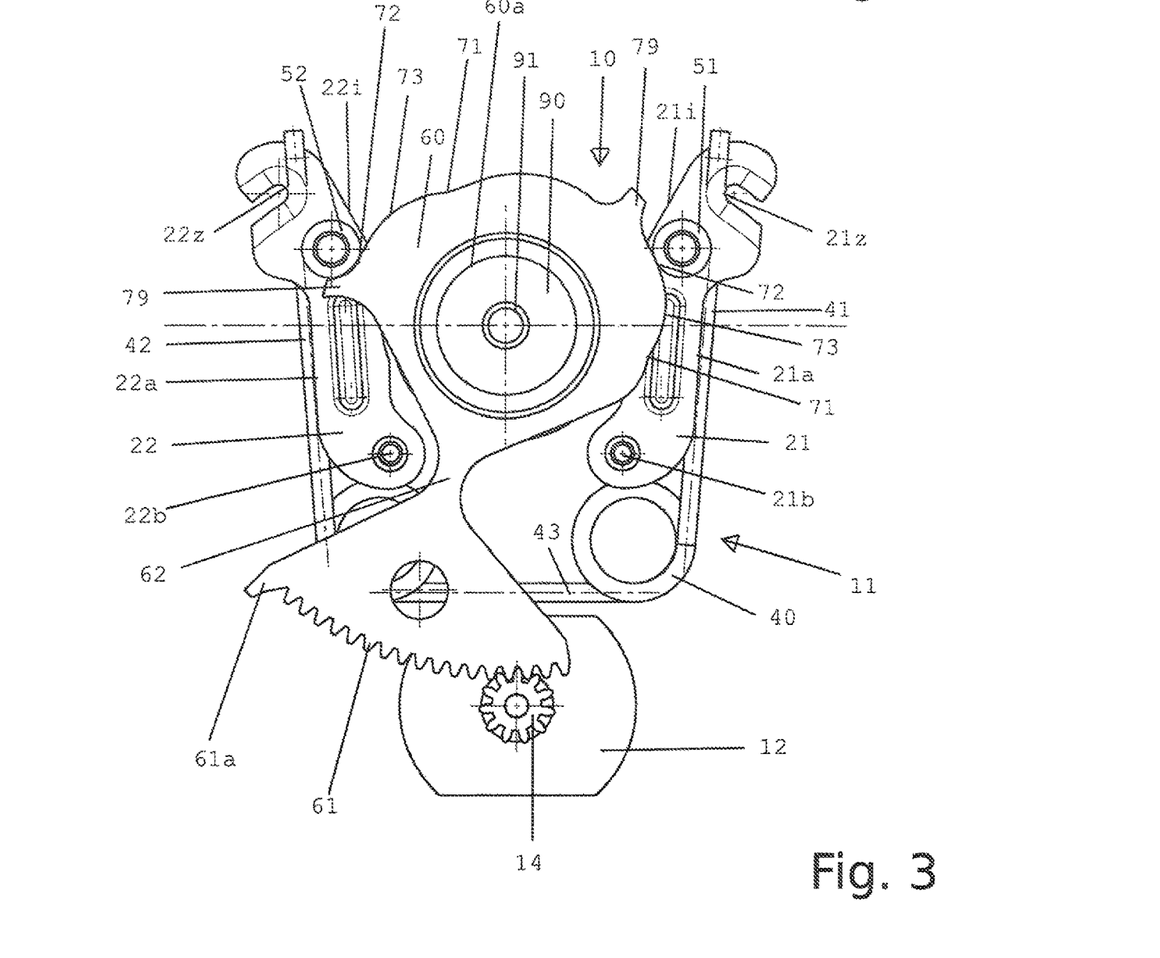
FIG. 3 is a plan view of the braking device from FIGS. 1 and 2 in the release position.
Figure 4:
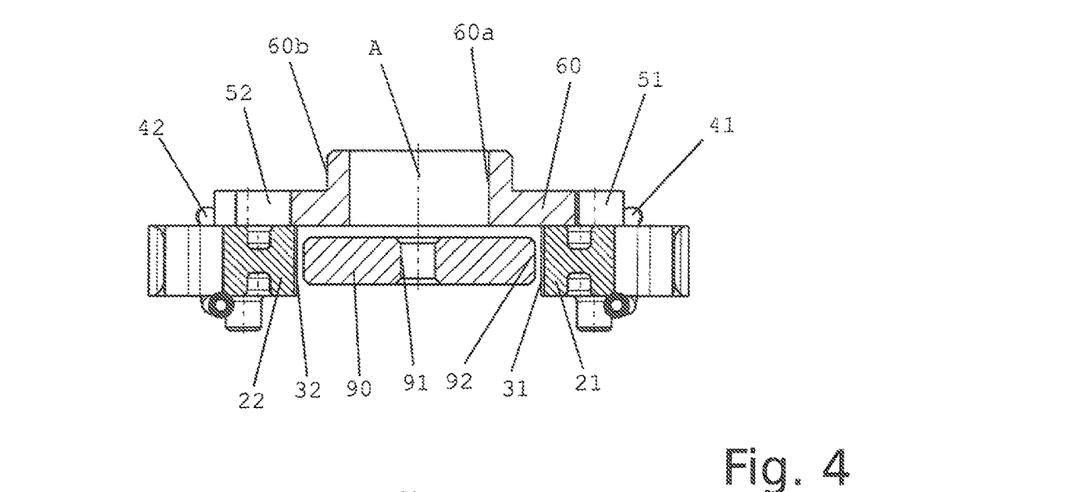
FIG. 4 is a section through the braking device of FIG. 3 along the line IV-IV.

In particular in FIGS. 3 and 4, it can be seen that at the maximum distance of the tooth 61a from the gear 14, the two guiding members 51, 52 each rest against the second circumferential portion biased by the spring member 40, wherein projections 79 on the circumference 60u of the eccentric disc 60 prevent the eccentric disc 60 from being significantly moved beyond the release position. It can be seen that the distance between the second circumferential portion 72 and the axis A of the eccentric disc 60 is greater than the distance between the first circumferential portion 71 of the eccentric disc 60.

Figure 5:
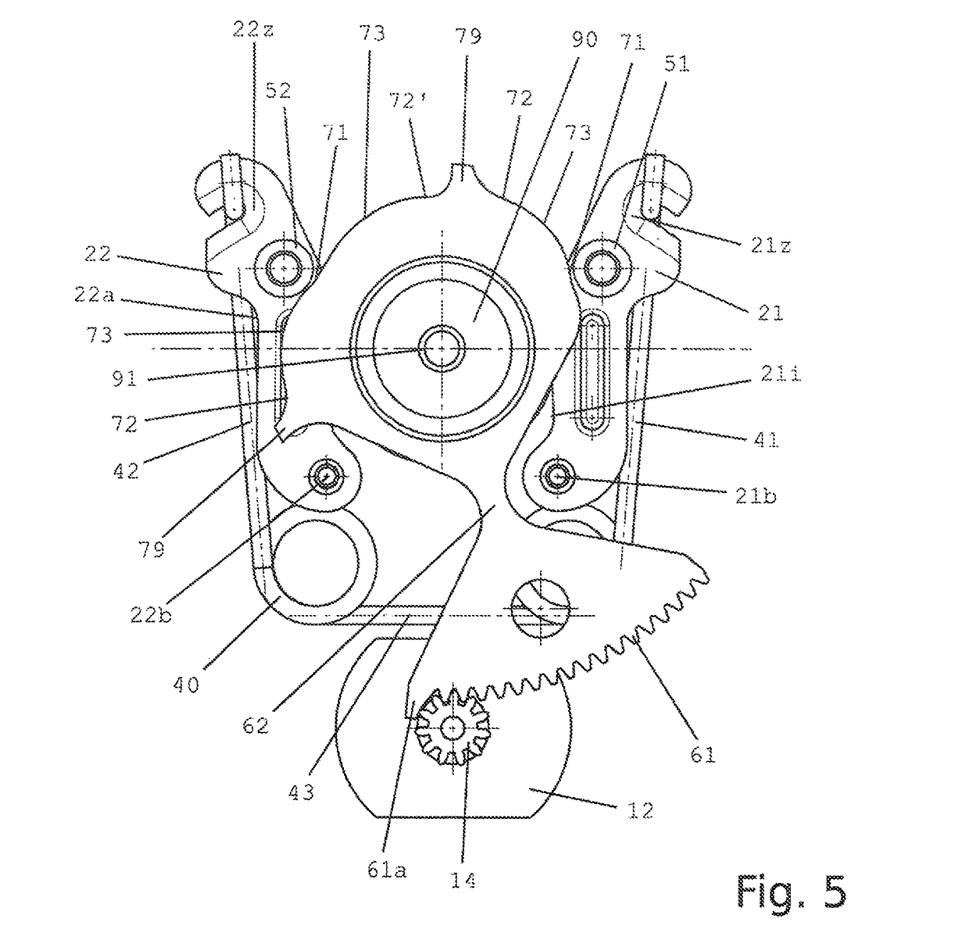
FIG. 5 is a plan view of the braking device from FIGS. 1 to 3 in the holding position.
Figure 6:
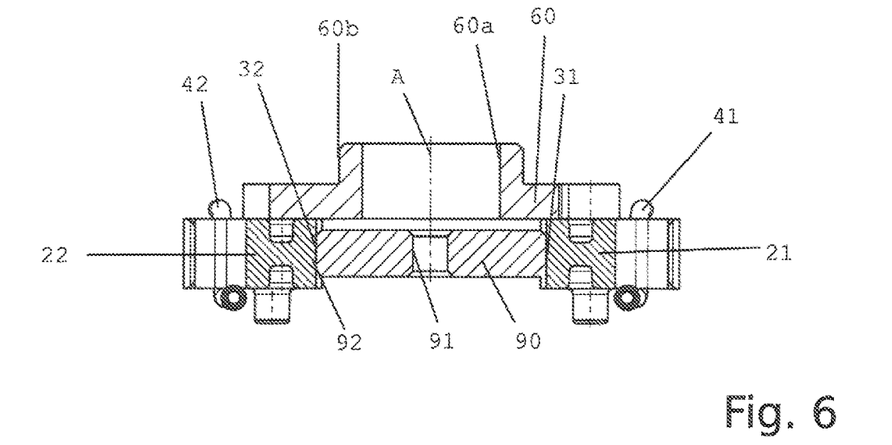
FIG. 6 is a section through the braking device of FIG. 5 along the line VI-VI.

In FIGS. 5 and 6 the guiding members 51, 52 lie in the region of the first circumferential portion 71, wherein the levers 21, 22 being moved in the direction of the outer circumference 92 of the disc 90 under the bias of the loading legs 41, 42. It can be seen that the guiding members 51, 52 no longer rest on the outer circumference 60u of the eccentric disc 60, but are slightly spaced therefrom, since the braking members 31, 32 now frictionally abut the outer circumference 92 of the disc 90 and under the bias of the spring member 40. The disc 90 is braked on both sides by the spring member 40 and the guiding members 51, 52 are accordingly positioned at a distance from the first circumferential portion 71, 72. It can be seen that the outer circumference 60u has a third circumferential portion 73 which is at a greater distance from the axis A of the eccentric disc 60 than the first circumferential portion 71 and/or the second circumferential portion 72, so that for transferring the guiding members from the one circumferential portion 71 to the other circumferential portion 72 an increased resistance of the spring member 40 must be overcome. The first circumferential portion 71 and the second circumferential portion 72 form metastable positions that do not allow the transition from one to the other without increased expenditure of force. It can also be seen that two stops 79 protrude radially on the outer circumference 60u of the eccentric disc 60 and prevent pivoting beyond the desired pivoting range.

The present disclosure then works as follows: If the shaft of the drivable part, which is non-rotatably connected to the disc 90, is in an energized state, the motor 12 is controlled in such a way that it assumes the release position shown in FIGS. 3 and 4. In this case, the guiding members 51, 52 are in contact with the relevant second circumferential portion 72 of the eccentric disc 60. If the drive is switched off, the motor 12 causes the eccentric disc 60 to pivot over the toothed portion 61 until the eccentric disc 60 has assumed the position shown in FIGS. 5 and 6. The guiding members 51, 52 are then preferably at a distance in the region of the first circumferential portions 71, and the braking members 31, 32 enclose the circumference 92 of the disc 90 in a frictional manner. As a result, a holding force corresponding to the spring force of the two loading legs 41, 42 is exerted on the disc 90, which means that even when the drive is switched off, it no longer allows any rotation.

The present disclosure has been explained above on the basis of an embodiment in which the levers 21, 22, the loading legs 41, 42, the braking members 31, 32 and the guiding members 51, 51 are each provided in mirror image and thus twice. This increases the overall operational safety. It has to be understood, however, that merely a single configuration of all the parts can also suffice to hold the disc 90.

The present disclosure has been described above using an embodiment in which a spring member 40 loads both levers 21, 22. It has to be understood that a dedicated spring member, that is to say a first spring member and a second spring member, can also be provided for each lever.

The present disclosure has been explained above on the basis of an embodiment in which a rotary motor 12 effects the adjustment of the eccentric disc 60 and thus the tensioning of the loading legs 41, 42. It has to be understood that, as an alternative, the loading legs 41, 42 can also be loaded and relieved in a different manner, for example by an axial actuator which moves the corresponding base 43 of the spring member 40.

The present disclosure has been explained above on the basis of an embodiment in which levers 21, 22 are used in order to achieve reproducible contact between the outer circumference 92 of the disc 90 and the braking members 31, 32. It has to be understood that the levers 21, 22 are not absolutely necessary for this if, for example, the braking members 31, 32 are provided on the loading legs 41, 42, and further expediently the guiding members 51, 52 are also arranged on the loading legs 41, 42.

The present disclosure has been described above on the basis of an embodiment in which a frictional connection between the braking members 31, 32 and the disc 90 is achieved. It has to be understood that, alternatively and/or cumulatively, the provision of engaging noses, teeth or flanks can produce a form-fitting contact which, however, is more difficult to overcome when operated manually.

The present disclosure has been explained above on the basis of an embodiment in which the spring member 40 is a double-legged torsion spring which provides a high spring force in a favorable manner in terms of installation space. It has to be understood that the spring member can also be provided in another way, for example as a torsion spring.

The present disclosure has been explained above using an embodiment in which the disc 90 can be connected in a rotationally fixed manner to a shaft of a drive. It has to be understood that the disc 90 can also be connected to another moving part, for example a hinge pin or the like, in a hinge or an articulated connection for blocking the pivoting.

What is claimed is:

1. A braking device for a drivable part, the drivable part being a vehicle flap in an automobile, the braking device comprising:
    a drivable loading device having a first holding position and a second release position, the drivable loading device being configured for being brought into radial contact with a cylindrical disc portion of the drivable part, the cylindrical disc portion having a rotational axis;
    the drivable loading device including:
        at least one braking member frictionally abutting a circumference of the cylindrical disc portion and securing the cylindrical disc portion against a rotation with a pre-settable force in the first holding position, the at least one braking member being spaced from the circumference of the cylindrical disc portion and allowing the cylindrical disc portion to run freely in the second release position;
        a motor configured for adjusting the drivable loading device between the first holding position and the second release position;
        a guiding member assigned to the braking member, the guiding member being out of contact with the cylindrical disc portion; and
        an eccentric disc cooperating with the guiding member, the eccentric disc having a bearing axis which is coaxial with the rotational axis of the cylindrical disc portion.

2. The braking device according to claim 1, wherein the guiding member is a rotatable roller attached to the at least one braking member.

3. The braking device according to claim 1, wherein the eccentric disc comprises a first circumferential portion in which the guiding member is arranged in the first holding position, and wherein the eccentric disc comprises a second circumferential portion in which the guiding member is arranged in the second release position.

4. The braking device according to claim 1, wherein the eccentric disc comprises a drive portion, and wherein the drive portion is coupled to the motor to impart a rotation of the eccentric disc about the bearing axis.

5. The braking device according to claim 4, wherein the drive portion comprises an externally toothed disc segment.

6. The braking device according to claim 4, wherein the eccentric disc comprises a first circumferential portion in which the guiding member is arranged in the first holding position, and wherein the eccentric disc comprises a second circumferential portion in which the guiding member is arranged in the second release position,
wherein the eccentric disc comprises a constricted portion, wherein the drive portion is provided on one side of the constricted portion, and wherein the first circumferential portion is provided on the other side of the constricted portion.

7. The braking device according to claim 4, wherein the drive portion is drivable by a gear driven by the motor.

8. The braking device according to claim 1, wherein the eccentric disc comprises a radial projection which forms a stop for the guiding member.

9. The braking device according to claim 1 further comprising:
a spring member loading the braking member towards the cylindrical disc portion, the spring member comprising a first loading leg, the first loading leg loading the braking member against the cylindrical disc portion, the first loading leg moving a first lever, and the braking member being arranged on the first lever.

10. The braking device according to claim 9, wherein the first lever is pivotably articulated about a first pivot joint.

11. The braking device according to claim 9, wherein the first lever comprises an abutment for the first loading leg.

12. The braking device according to claim 9, wherein the braking member comprises a braking surface of the first lever.

13. The braking device according to claim 9, wherein a distance between an articulation of the lever and the braking member is smaller than a diameter of the cylindrical disc portion.

14. A braking device for a drivable part, the drivable part being a vehicle flap in an automobile, the braking device comprising:
a drivable loading device having a first holding position and a second release position, the drivable part comprising a cylindrical disc portion;
the drivable loading device including:
a first braking member pivotally attached to a first pivot joint and a second braking member pivotally attached to a second pivot joint distant from the first pivot joint;
a rotative actuator being in operative contact with the first braking member and the second braking member;
wherein the first braking member radially abuts a first circumference portion of the cylindrical disc portion in the first holding position to arrest the cylindrical disc portion against a rotation and wherein the first braking member is spaced from the first circumference portion of the cylindrical disc portion in the second release position to allow the cylindrical disc portion to run freely,
wherein the second braking member radially abuts a second circumference portion of the cylindrical disc portion in the first holding position to arrest the cylindrical disc portion against a rotation and wherein the second braking member is spaced from the second circumference portion of the cylindrical disc portion in the second release position to allow the cylindrical disc portion to run freely,
wherein the rotative actuator device is adjustable between the first holding position and the second release position by a rotational movement,
wherein the rotative actuator comprises a radial projection protruding between the first pivot joint and the second pivot joint,
wherein the radial projection comprises a coupling arrangement for an external motor, and
wherein the radial projection of the rotative actuator comprises a constricted portion having a first concave surface oriented toward the first pivot joint and a second concave surface opposite the first concave surface and oriented toward the second pivot joint,
wherein the coupling arrangement of the radial projection comprises a toothed segment for meshing engagement with a gear of the external motor, and
wherein a gear axis of the gear of the external motor is parallel to a rotational axis of the cylindrical disc portion.

15. The braking device according to claim 14, wherein at least one spring member loads at least one of the first and second braking members towards the respective first and second circumference portions of the cylindrical disc portion, and wherein the at least one spring member comprises at least one deflectable loading leg for urging said one of the first and second braking members toward one of said respective first and second circumference portions.

16. The braking device according to claim 15, wherein the drivable loading device includes a first lever comprising the first braking member and a second lever comprising the second braking member,
wherein the first lever is pivotally attached to the first pivot joint,
wherein the second lever is pivotally attached to the second pivot joint,
wherein the first lever comprises a first recess for receiving a distal portion of the at least one deflectable loading leg, and
wherein the second lever comprises a second recess for receiving a distal portion of the at least one deflectable loading leg.

17. The braking device according to claim 16, wherein the first lever comprises a first guiding member protruding to cooperate with the rotative actuator, wherein the second lever comprises a second guiding member protruding to cooperate with the rotative actuator, such that upon a rotation of the rotative actuator responsive to a driving movement of the motor, the first and second guiding members together with the first and second levers are simultaneously radially displaced depending upon a radial bulge of the rotative actuator to engage the first and second braking members with the first and second circumference portions of the cylindrical disc portion under a load of the at least one deflectable loading leg in the first holding position and the first and second guiding members together with the first and second levers are simultaneously radially displaced depending upon the radial bulge of the rotative actuator to disengage the first and second braking members from the first and second circumference portions of the cylindrical disc portion against a load of the at least one deflectable loading leg in the second release position.

18. The braking device according to claim 14, wherein the rotative actuator comprises an eccentric flat body comprising a first protruding circumferential edge and a first retracted circumferential edge for engagement with a first guiding member assigned to the first braking member, wherein the eccentric flat body comprises a second protruding circumferential edge and a second retracted circumferential edge for engagement with a second guiding member, assigned to the second braking member, such that upon a rotation of the rotative actuator responsive to a driving movement of the motor, the first and second guiding members together with the first and second braking members are simultaneously radially displaced depending upon a rotational orientation of the rotative actuator to engage the first and second braking members with the first and second circumference portions of the cylindrical disc portion in the first holding position and the first and second guiding members together with the first and second braking members are simultaneously radially displaced depending upon a radial bulge of the rotative actuator to disengage the first and second braking members from the first and second circumference portions of the cylindrical disc portion in the second release position.

19. The braking device according to claim 14, wherein the rotative actuator comprises a flat body comprising a first protruding contact surface and a first retracted contact surface assigned to deflect the first braking member, wherein the flat body comprises a second protruding contact surface and a second retracted contact surface assigned to deflect the second braking member, wherein the flat body is rotatable about a rotational axis of the cylindrical disc portion, and wherein the flat body radially protrudes over the cylindrical disc portion.

* * * * *